United States Patent Office 2,805,221
Patented Sept. 3, 1957

2,805,221

ISOSAPOGENINS

Monroe E. Wall, Oreland, Pa., assignor to the United States of America as represented by the Secretary of Agriculture No Drawing. Application May 27, 1955,
Serial No. 511,813

20 Claims. (Cl. 260—239.55)

(Granted under Title 35, U. S. Code (1952), sec. 266)

This application is a continuation-in-part of my copending application entitled "Isosapogenins" filed June 30, 1954, Serial Number 440,571, now abandoned.

This invention relates to 20-isosapogenins, to methods for preparation of such compounds, and the processes for converting them into pregnenones and other useful steroidal compounds.

Steroidal sapogenins constitute a small, well known class of steroids obtained by the hydrolysis of their naturally occurring glycosides and having the basic structure shown below.

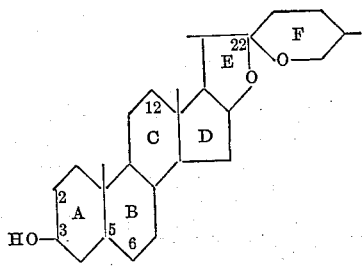

All known steroidal sapogenins have the same basic structure but differ in several ways. For example, additional hydroxyl groups may occur at positions 2 and 6; a carbonyl group may occur at position 12; a double bond may occur at positions 5—6; cis and trans isomerism may exist at the juncture of rings A and B; and geometrical isomerism may appear at position 22. All these variants are known and give rise to the known steroidal sapogenin species.

Treatment of steroidal sapogenins with acetic anhydride at about 200° C. for several hours opens the F-ring and yields pseudosapogenin diacetates. These on hydrolysis yield pseudosapogenins. These reactions and products are well known. The formula of pseudosarsasapogenin, a typical example, is the following:

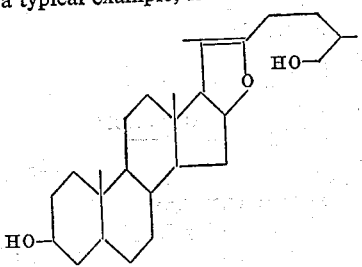

It is well known that treatment of pseudosapogenins with hot hydrochloric acid regenerates the F-ring and yields the original sapogenin. It is also known that treatment of the pseudosapogenins with CrO3 in acetic acid yields pregnenones useful in the production of sex hormones and other valuable steroid derivatives. While these reactions have been used to convert steroidal sapogenins into pregnenones, they are not satisfactory because of the low yields obtained and the difficulties encountered in purifying the products. The pseudosapogenins are rather unstable and are particularly difficult to isolate and purify. Consequently, the usual practice has been to make no attempt to isolate them but rather to oxidize them in the reaction mixture in which they were formed. This has resulted in pregnenones being formed in grossly contaminated and intractable reaction mixtures from which they could be recovered only by tedious procedures resulting in low yields.

An object of this invention is to provide new and useful steroidal sapogenin derivatives; another object is to provide improved processes for converting steroidal sapogenins into new compounds that are readily isolated and purified and are also readily converted into pregnenones and other valuable steroid derivatives. Still another object is to provide new and improved processes for the production of pregnenones.

According to the invention, any steroidal sapogenin may be converted to the isomeric 20-isosapogenin and the latter in turn may be oxidized to a pregnenone. The sapogenin is first converted to the corresponding pseudosapogenin by any known process. The pseudosapogenin or the reaction mixture containing it, is then treated with weak acid at substantially roof temperature whereby it is converted to the 20-isosapogenin. The 20-isosapogenins are readily isolated and purified and are extremely useful as intermediates for the synthesis of sex hormones and other steroidal compounds. Thus, they are readily oxidized to pregnenones by the same procedures used to oxidize pseudosapogenins to pregnenones. The most commonly used procedure is to treat with a solution of CrO3 in acetic acid, though other variants are known. The pregnenones thus obtained are identical with those obtained by the oxidation of the pesudosapogenins but are obtained in higher yield and greater purity. The reactions are illustrated below, smilagenin being taken as a typical example of a sapogenin.

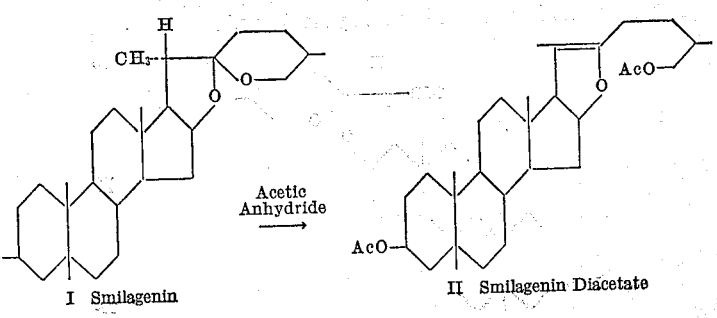

I Smilagenin   II Smilagenin Diacetate

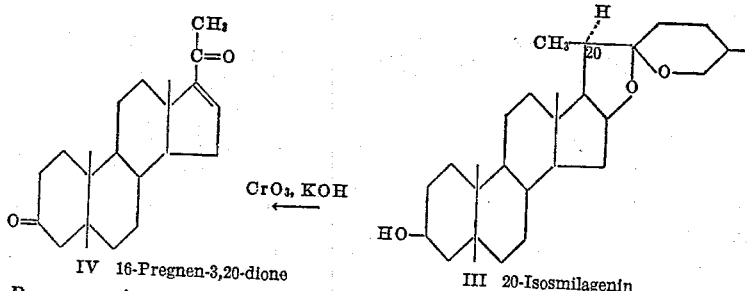

IV 16-Pregnen-3,20-dione        III 20-Isosmilagenin

By comparing Formulas I and III, above, it will be seen that the natural sapogenins and the isosapogenins of this invention are identical except for the configuration at $C_{20}$. Examination of molecular models of these two isomeric compounds shows that the E-ring of the iso compounds is highly strained. It is believed that this strained configuration accounts for the greater reactivity of the iso compounds, particularly their susceptibility to oxidation. The natural sapogenins are inert to the conventional $CrO_3$ oxidation used to convert pseudosapogenins to pregnenones. In contrast, the 20-isosapogenins are readily cleaved by $CrO_3$, yielding 20-keto-16-pregnenes.

The invention is more fully illustrated by the following examples.

EXAMPLE I

Sarsasapogenin was converted to pseudosarsasapogenin by well known conventional procedures.

Ten grams of pseudosarsasapogenin were dissolved in 300 ml. of absolute ethanol and then 3 ml. of concentrated hydrochloric acid were added. After being allowed to stand at room temperature for 15 minutes a slight excess of sodium carbonate and an equal volume of water was added. A precipitate of 20-isosarsasapogenin having the formula

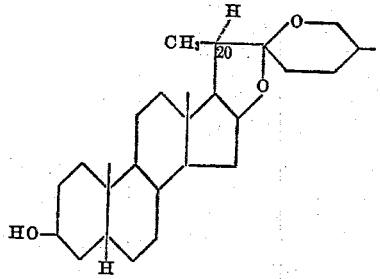

was thus formed and was filtered out, washed with water and dried. The product (9.0 g.) was recrystallized from methanol.

EXAMPLE II

Ten grams of pseudosmilagenin, obtained from smilagenin by conventional procedures, were dissolved in 200 ml. of absolute ethanol. To this solution 200 ml. of glacial acetic acid were added and the mixture was left overnight at room temperature. Dilution with water then precipitated 20-isosmilagenin having the formula

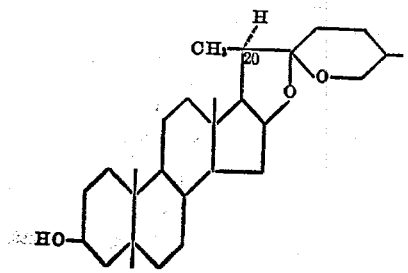

was filtered out, washed, dried, and recrystallized from methanol.

In the same manner pseudodiosgenin, pseudohecogenin, pseudotigogenin were converted to the corresponding 20-isosapogenins.

EXAMPLE III

Five grams of 20-isosarsasapogenin were dissolved in 150 ml. of glacial acetic acid. To this was added dropwise, with stirring a solution of 5 g. of $CrO_3$ in 80% acetic acid in water, the temperature being held at 15° C. After the solutions had been mixed and held 1 hour at room temperature, the product was extracted with ether. The ether solution was thoroughly washed with water, after which the ether was removed by evaporation. The residue was dissolved in tert.-butanol containing 5 g. of KOH dissolved in 10 ml. of water. This 2-phase mixture was stirred at room temperature for 3 hours. Dilution with water and extraction with ether then yielded 60% of the theoretical amount of 16-pregnen-3,20-dione.

EXAMPLE IV

Ten grams sarsasapogenin were heated with 20 ml. acetic anhydride at 200° C. for 10 hours. The acetic anhydride was evaporated in vacuo and the residue refluxed with 20 grams KOH in 200 ml. methanol. An excess of glacial acetic acid was then added and after standing overnight, water was added and the crude 20-isosarsasapogenin filtered off. This was then oxidized to 16-pregnen-3,20-dione as in Example III.

Similar oxidation of 20-isosmilagenin, 20-isotigogenin and 20-isohecogenin yielded respectively 16-pregnen-3,20-dione, 16-allopregnen-3,20-dione, 16-allopregnen-3,12,20-trione.

In accordance with the foregoing examples, 20-isodiosgenin, 20-isotigogenin, and 20-isohecogenin, having the following configurations, were also produced:

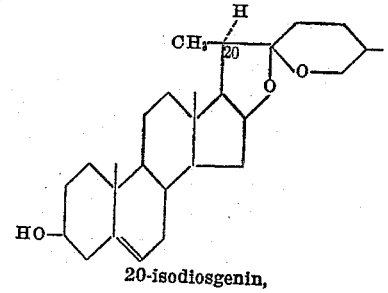

20-isodiosgenin,

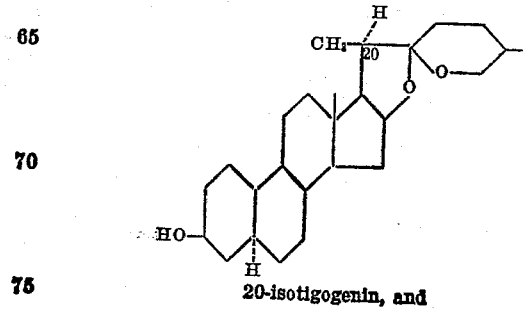

20-isotigogenin, and

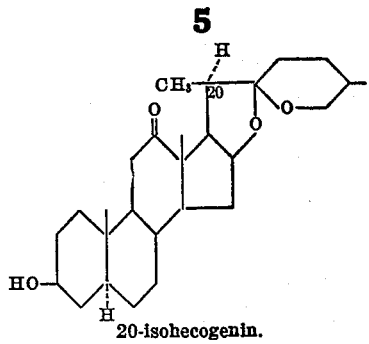

20-isohecogenin.

The characteristics of these compounds are given in Table I below.

For converting pseudosapogenins to 20-isosapogenins almost any acid may be used. If a strong acid is used it must be highly diluted. On the other hand, if a weak acid is used it may be used in almost any concentration. Heat is not essential and, when using any but a very weak acid, is detrimental.

The great advantage of making the 20-isosapogenins as intermediates in the conversion of sapogenins to pregnenones is that they are easily isolated and purified, and the subsequent oxidation step gives higher yields and more readily purified products when starting with a pure 20-isosapogenin than when starting with a reaction mixture containing crude pseudosapogenin.

Table I
OBSERVED PROPERTIES OF 20-ISOSAPOGENINS

| 20-iso-Compound | M.P., °C. | [α]ᴅ | Infrared Absorption Peaks, cm.⁻¹ |
|---|---|---|---|
| Sarsasapogenin | 176 | +32 | 905, 917, 965, 985 |
| Smilagenin | 185 | −60 | 897, 920, 964, 974 |
| Hecogenin | 210–220 |  | 899, 925, 973 |
| Diosgenin | 190–200 |  | 899, 925, 963, 975 |
| Gitogenin | 222–228 | −56 | 969, 921, 897, 788 |
| Manogenin | 210–220 | +2 | 972, 922, 897, 785 |
| Markogenin | 189–192 | +18 | 984, 918, 905 |
| Tigogenin | 189–195 | −65 | 973, 922, 896, 787 |
| Yamogenin | 165–175 | −10 | 979, 917, 904 |

I claim:

1. Steroidal 20-isosapogenins selected from the group consisting of

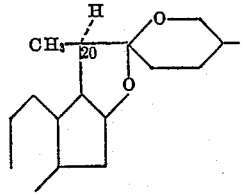

and

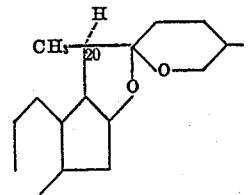

2. 20-isosarsasapogenin.
3. 20-isotigogenin.
4. 20-isosmilagenin.
5. 20-isohecogenin.
6. 20-isodiosgenin.

7. A process for making steroidal 20-isosapogenins selected from the group consisting of

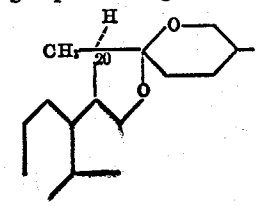

and

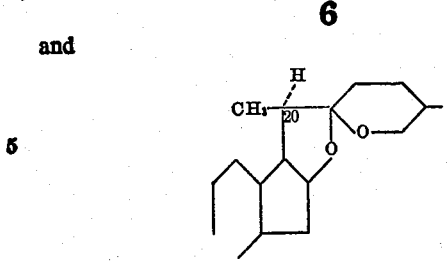

which comprises treating the corresponding pseudosapogenins with weak acid at substantially room temperature and recovering the thus formed 20-isosapogenins.

8. The process of claim 7 wherein the weak acid is an alcoholic solution of acetic acid.

9. A process as in claim 7 wherein the 20-isosapogenin recovered is 20-isosarsasapogenin.

10. A process as in claim 7 wherein the 20-isosapogenin recovered is 20-isotigogenin.

11. A process as in claim 7 wherein the 20-isosapogenin recovered is 20-isosmilagenin.

12. A process as in claim 7 wherein the 20-isosapogenin recovered is 20-isohecogenin.

13. A process as in claim 7 wherein the 20-isosapogenin recovered is 20-isodiosgenin.

14. A process for making steroidal 20-isosapogenins selected from the group consisting of

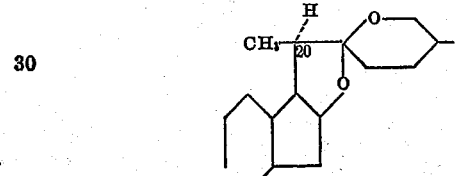

and

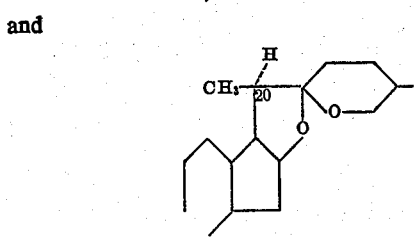

which comprises converting the corresponding natural sapogenins to the corresponding pseudosapogenins; then, without isolating said pseudosapogenin from the raction mixture, treating them with weak acid at substantially room temperature, thus to convert them to the 20-isosapogenins; and finally, recovering the 20-isosapogenin from the reaction mixture.

15. A process as in claim 14 wherein the weak acid is an alcoholic solution of acetic acid.

16. A process as in claim 14 wherein the 20-isosapogenin recovered is 20-isosarsasapogenin.

17. A process as in claim 14 wherein the 20-isosapogenin recovered is 20-isotigogenin.

18. A process as in claim 14 wherein the 20-isosapogenin recovered is 20-isosmilagenin.

19. A process as in claim 14 wherein the 20-isosapogenin recovered is 20-isohecogenin.

20. A process as in claim 14 wherein the 20-isosapogenin recovered is 20-isodiosgenin.

References Cited in the file of this patent
FOREIGN PATENTS
552,047    Great Britain _____ Nov. 22, 1943

OTHER REFERENCES
Amer. Chem. Soc., vol. 76, May 20, 1954, p. 2849–2852.